Nov. 29, 1938.   P. H. CRAIG   2,138,732
ELECTRIC REGULATOR
Filed Sept. 21, 1936    4 Sheets-Sheet 1

Inventor
Palmer H. Craig,
By Ralph B. Stewart
Attorney

Nov. 29, 1938.  P. H. CRAIG  2,138,732

ELECTRIC REGULATOR

Filed Sept. 21, 1936    4 Sheets-Sheet 2

Inventor
Palmer H. Craig,

By Ralph B. Stewart
Attorney

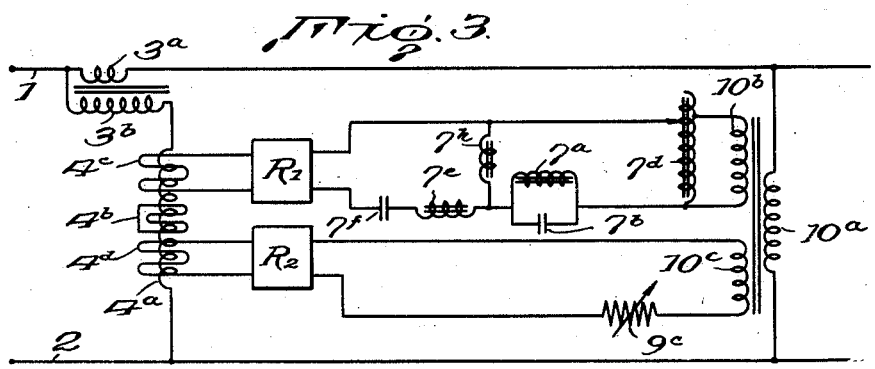
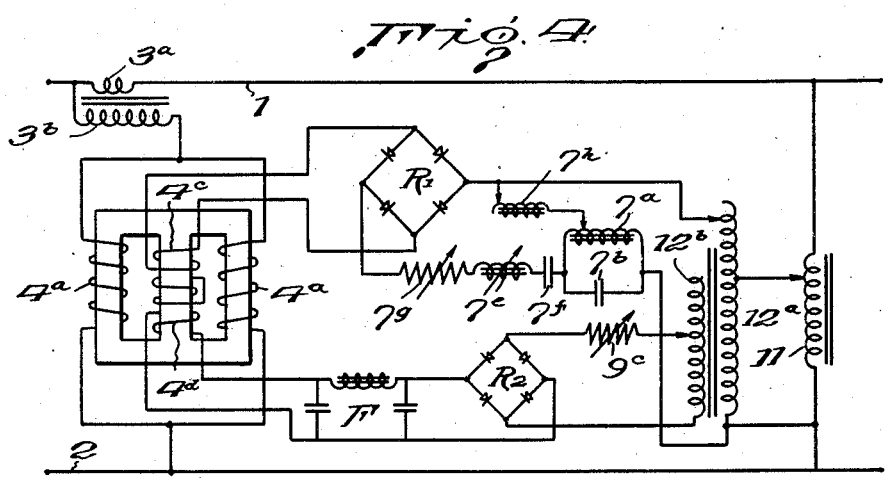
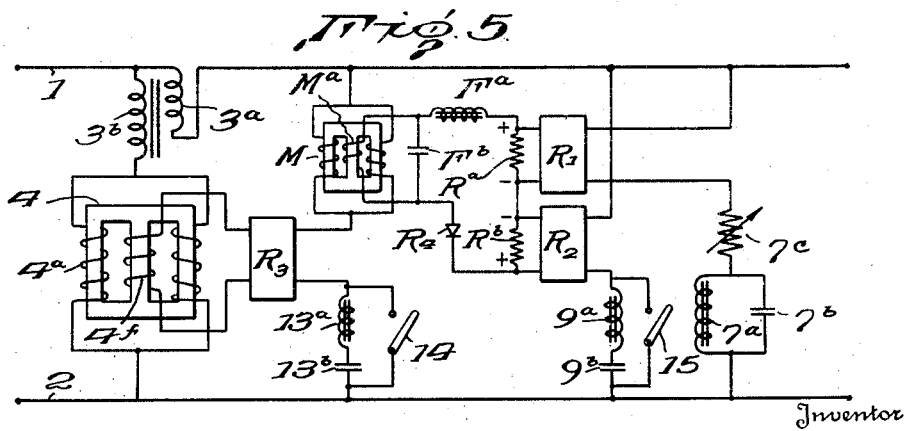

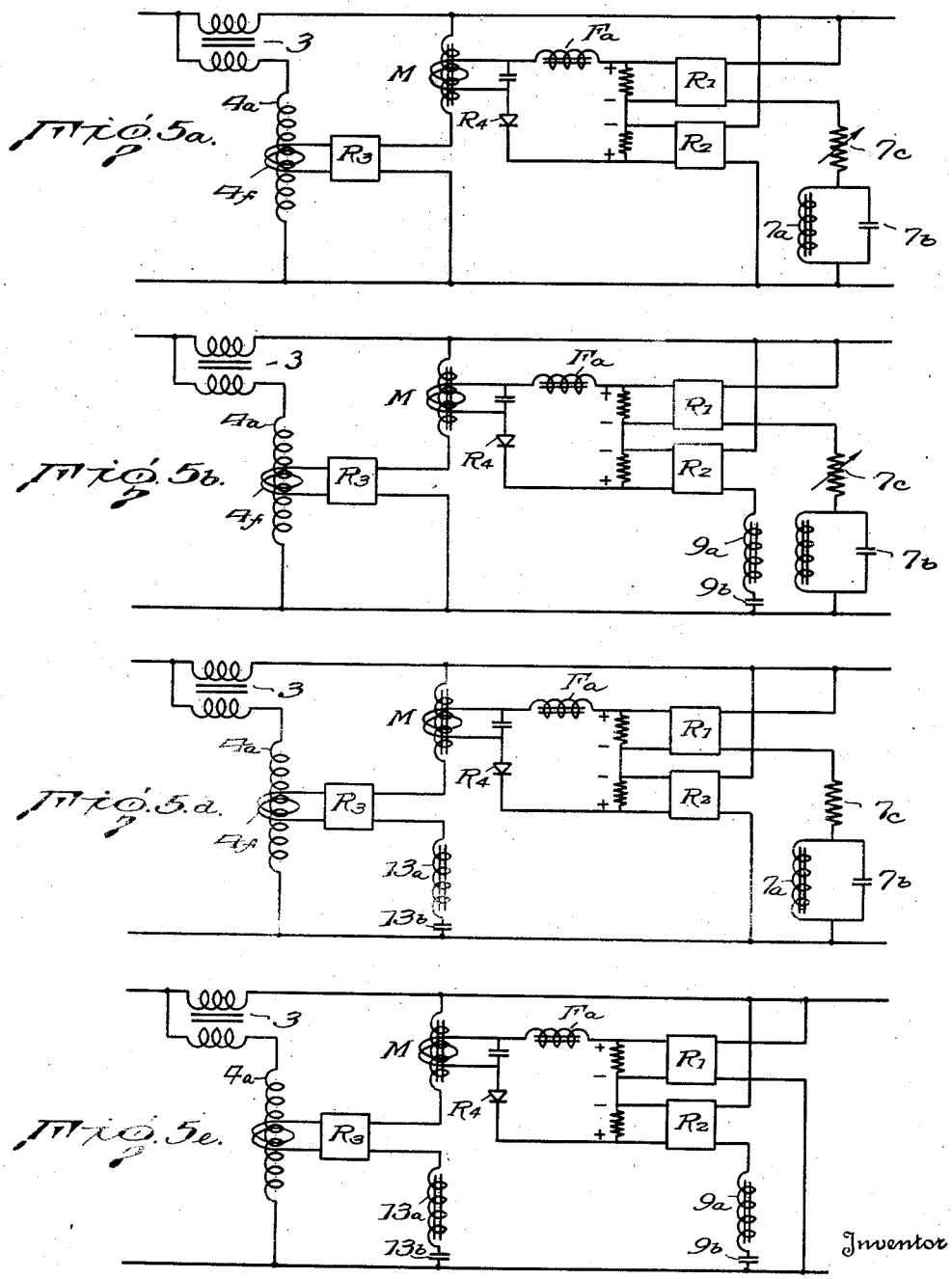

Patented Nov. 29, 1938

2,138,732

UNITED STATES PATENT OFFICE 2,138,732

ELECTRIC REGULATOR

Palmer Hunt Craig, Bethlehem, Pa., assignor to Invex Corporation, New York, N. Y., a corporation of New York Application September 21, 1936, Serial No. 101,856

18 Claims. (Cl. 171—119)

This invention relates to electric regulators and in particular to regulators for maintaining substantially constant voltage on electric supply lines.

My invention involves the use of ferro-resonant circuits which are sensitive to voltage changes, and while the circuit arrangements disclosed herein are particularly useful in a regulator for controlling the boost of a booster transformer, the voltage sensitive circuits disclosed in this application may also be used in regulator systems generally.

An object of the present invention is to devise a system for automatically controlling the boost of a booster transformer without relays having movable contacts and without apparatus depending upon the use of motors for its operation.

A further object of my invention is to devise an automatic regulating system which does not involve the use of vacuum tubes, and while my invention involves the use of rectifiers which may take the form of a vacuum tube rectifier, I prefer to use rectifiers of the well known "dry" type.

A further object of my invention is to devise a voltage sensitive circuit which is highly sensitive to voltage changes and which responds to the same degree for voltage changes in either direction, that is, its response characteristic is substantially the same for increasing voltages as for decreasing voltages.

Still another object is to devise an improved voltage sensitive circuit using both series resonance and parallel resonance, the combination being so arranged that the series resonance serves to amplify or magnify the effect of the parallel resonance.

Various forms of my invention are illustrated in the accompanying drawings in which.

Figure 1:
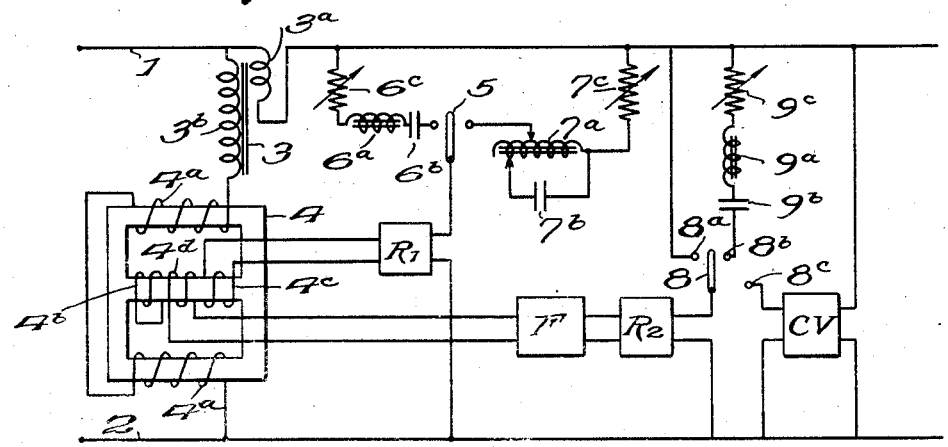
Figure 1 is a circuit diagram illustrating various arrangements for controlling the boost of a booster transformer by varying the impedance of a reactor connected in series with the primary winding of the booster transformer.

Figures 1b to 1g inclusive are diagrams showing various circuit arrangements obtainable from Figure 1.

Figure 2:
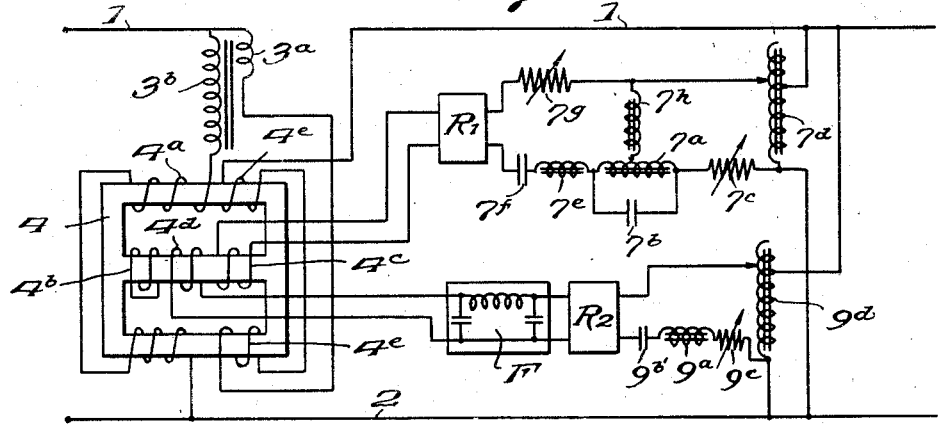

Figure 2 is a circuit diagram of a modified arrangement of my invention in which the controlling reactor is provided with bucking coils acting in opposition to the booster winding on the booster transformer;

Figure 3 is a circuit diagram of a simplified arrangement according to my invention;

Figure 4 is a circuit diagram illustrating another modification of my invention, and Figure 5 is a circuit diagram illustrating a modified arrangement of the output circuits of the control rectifiers and also showing the use of magnetic amplifiers for increasing the effect of the control circuit.

Figures 5a, 5b, 5d and 5e are circuit diagrams showing various circuit arrangements obtainable from Figure 5.

Referring to Figure 1 I have shown a section of a pair of distribution lines 1 and 2 the left hand terminals of which are connected to a suitable source of alternating current (not shown) and the right hand terminals are connected to a suitable load (not shown). A booster transformer 3 has a current winding 3a connected in series with one of the line conductors and a voltage winding 3b connected across the transmission conductors in series with the winding 4a of a saturatable reactor 4. The saturatable reactor is provided with an iron core having three legs arranged as shown in the drawings, and the winding 4a is divided into two sections arranged on the outer legs. Three windings 4b, 4c and 4d are arranged on the center leg, and the arrangement is such that normally there is practically no magnetic coupling between the winding 4a and any of the windings surrounding the center leg. The winding 4b is short-circuited upon itself to reduce the action of any alternating current flux which might flow in the center leg. Windings 4c and 4d are magnetizing windings for saturating the core of the reactor.

Winding 4c is supplied with direct current from the rectifier R1 which in turn is energized from transmission conductors 1 and 2 through suitable voltage sensitive circuits. By shifting the switch 5 to the left, rectifier R1 is supplied with current from the line conductors through a series ferro-resonant combination consisting of an iron-cored coil 6a and a condenser 6b connected in series with a variable resistance 6c. By shifting the switch 5 to the right, rectifier R1 may be supplied with alternating current through a parallel ferro-resonant circuit consisting of an iron-cored coil 7a shunted by a condenser 7b and connected in series with a variable resistance 7c. For flexibility of adjustment, the connection from the rectifier to the parallel resonant circuit may be made by an adjustable tap on coil 7a, but the parallel resonant circuit may be a simple circuit of fixed constants, if desired.

Magnetizing winding 4d is supplied with direct current from rectifier R2 which in turn is energized from the line conductors 1 and 2 through suitable circuits. A filter F may be inserted between rectifier R2 and winding 4d in order to prevent interference between the circuits supplying windings 4c and 4d, although this filter is not essential. By placing switch 8 on contact 8a, rectifier R2 is supplied with current directly from the transmission conductors. When switch 8 occupies the position 8b, the rectifier R2 is supplied with current through a voltage sensitive circuit consisting of an iron-cored coil 9a connected in series with a condenser 9b and a variable resistance 9c. When switch 8 is on contact 8c, rectifier R2 is supplied with constant current from the line conductors 1 and 2 through a suitable constant voltage supply network indicated at CV.

Various operative combinations can be illustrated from the arrangement shown in Figure 1 by placing the switches 5 and 8 in different positions. It will be understood that these switches have been shown merely for the convenience of explaining the invention and that in any given situation, the particular combination employed may be set up with elements designed particularly for that combination, and switches 5 and 8 will not be used. A number of possible combinations will be explained.

Figure 1A:
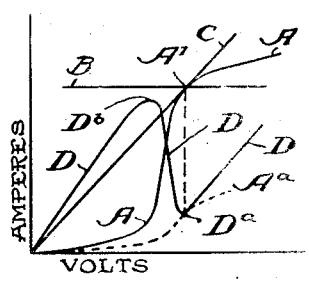
Figure 1a is a set of curves for explaining the operation of the regulator circuits.
Figure 1B:
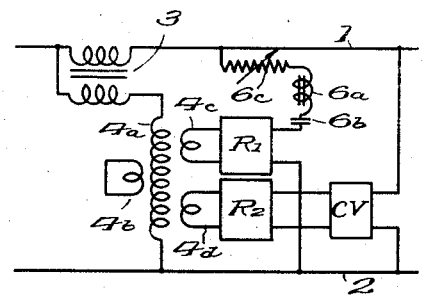

*Combination #1.*—Switch 5 to the left and switch 8 on contact 8c (see Figure 1b). With this arrangement, magnetizing coil 4c will be supplied with direct current through a series ferro-resonant circuit while magnetizing coil 4d will be supplied with a constant direct current. In Figure 1a curve A represents the variation in magnetizing current flowing in coil 4c with changes in voltage on line conductors 1 and 2. The voltage sensitive circuit is adjusted so that it is in optimum resonance at the highest voltage normally encountered on the line, which normally is the no-load voltage of the line. The optimum resonant point is indicated at A' in Figure 1a. As will be seen from the drawings, any tendency for the line voltage to drop below point A' will result in a sharp decrease in the magnetizing current flowing in coil 4c. Curve B shown in Figure 1a illustrates the current supplied to winding 4d, which is a constant current and is adjusted so that it opposes and substantially neutralizes the magnetizing effect of the current flowing in coil 4c at the optimum resonant condition. In case the two magnetizing coils are identical, the two currents will be equal for this condition as indicated at the point A'. The reactor 4 is designed so that in its unsaturated condition it absorbs the major part of the potential drop in the primary circuit of the booster transformer and the boosting voltage produced by the transformer is very low.

In case the line voltage drops below point A', the magnetizing current in winding 4d remains constant, but the current in winding 4c drops very sharply as shown by the curve A, and there will be a resultant magnetizing flux set up in the core of the reactor 4 which decreases the impedance of the reactor and, therefore, decreases the voltage drop across the reactor and increases the voltage across the primary winding of the booster transformer, which results in an increase in the booster voltage of the transformer. The more the line voltage drops below the point A', the greater will be the resulting saturation of reactor 4 and the greater the boost of the booster transformer. In case the line voltage should rise above the point A' due to surges or abnormal conditions, no substantial saturation will occur, since there is less difference between the curves A and B above point A' than below this point.

Figure 1C:
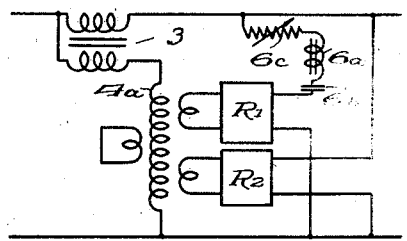

*Combination #2.*—Switch 5 in the left-hand position and the switch 8 on contact 8a (see Figure 1c). The operation of the circuit for this combination is represented by curves A and C of Figure 1a. Curve C represents the variation in magnetizing current supplied to winding 4d with changes in voltage of conductors 1 and 2. In this combination, the current in the winding 4d is adjusted to balance the magnetizing effect of the winding 4c at the point A'. From an inspection of Figure 1a, it will be seen that the operation of this combination is generally like that of Combination #1 except that the resultant magnetization produced by the coil 4d and 4c is represented by the difference between the curves C and A, which is a smaller difference than that obtained between the curves B and A.

Figure 1D:
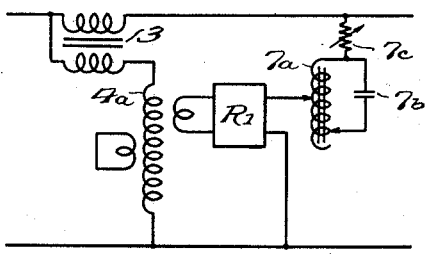

*Combination #3.*—Switch 5 to the right and switch 8 in open circuit position (see Figure 1d). With this combination, the current supplied to magnetizing winding 4c through the parallel resonant circuit is represented by curve D in Figure 1a, and the magnetizing winding 4d is not energized. In this combination, the voltage sensitive circuit is adjusted so that it is in resonance at the point Da in Figure 1a at the highest voltage normally encountered on the line. As will be seen, the current flowing through the winding 4c is quite small and the reactor 4 is only slightly magnetized. Any tendency for the line voltage to drop below the point Da results in an increase in the magnetizing current flowing in winding 4c, and, therefore, decreases the impedance of reactor and increases the boost of the booster transformer. The point Da is the optimum resonant point for a parallel resonant circuit, that is, it is the point of minimum current at resonance.

Figure 1E:
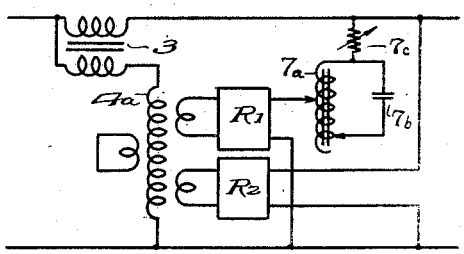

*Combination #4.*—Switch 5 to the right and switch 8 on contact 8a (see Figure 1e). This combination operates substantially the same as Combination #3. In this arrangement, current supplied to winding 4c is represented by the curve D in Figure 1a and the adjustment is the same as in Combination #3. The current supplied to winding 4d is sufficient only to neutralize the magnetizing action of winding 4c at the resonant point Da on curve D. The resulting magnetizing current supplied to the reactor as the line voltage drops below the point Da will be proportional to the difference between the curve D and a straight line drawn through the point Da and passing through the origin of Figure 1a.

Figure 1F:
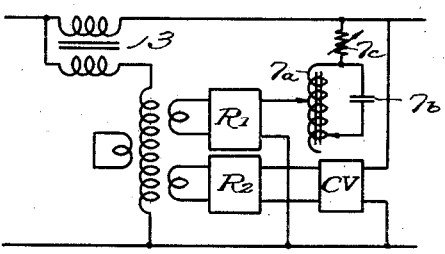

*Combination #5.*—Switch 5 to the right and switch 8 on contact 8c (see Figure 1f). This combination is substantially the same as Combinations 3 and 4 except that the magnetizing action of the winding 4c at the point 4d is neutralized by a constant current supplied to winding 4d. The resulting magnetizing current supplied to the reactor is represented by the difference between the curve D and a horizontal line drawn through the point Da on curve D.

Figure 1G:
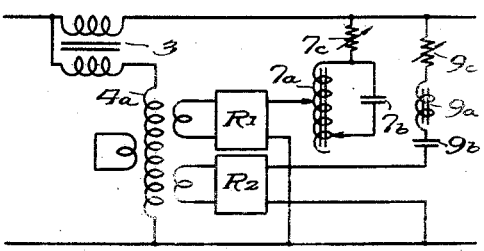

*Combination #6.*—Switch 5 to the right and switch 8 on contact 8b (see Figure 1g). With this combination, the current supplied to the winding 4c is represented by curve D and the resonant point Da is adjusted to occur at the highest voltage normally encountered on the line. The magnetizing current supplied to winding 4d from the series resonant circuit 9a—9b—9c is represented by the dashed curve Aa, and this circuit is adjusted so that its resonant point coincides with the resonant point Da of the curve D. As will be seen from Figure 1a, the resulting magnetization of the reactor 4 will be that caused by a current represented by the difference between the curves D and Aa below the point Da. It will be noted that as the current in winding 4c increases, the current in winding 4d decreases.

Figure 2 is a circuit diagram illustrating a combination generally like Combination #6 described above. Elements corresponding to similar elements in Figure 1 are indicated by the same reference numerals.

The arrangement of Figure 2 differs from Figure 1 in that the reactor 4 is provided with a bucking winding 4e connected in series with line conductor 1 in opposition to the booster winding 3a, and the arrangement is such that with the reactor in unsaturated condition, the buck of winding 4e substantially neutralizes the boost of winding 3a.

The control circuits of Figure 2 also differ from Figure 1 in that variable tap auto-transformers 7d and 9d are employed to connect the voltage sensitive circuits of rectifiers R1 and R2 respectively to the line conductors. The voltage sensitive circuit for rectifier R1 also differs from the circuit shown in Figure 1 in that a series combination consisting of an iron-cored coil 7e and a condenser 7f is connected in series with the parallel combination 7a—7b, and an iron cored coil 7h is connected in shunt to the control circuit, preferably by a variable tap on the coil 7a. A variable resistance 7g may also be included in the circuit as shown to control the sharpness of resonance and the degree of response.

The operation of Figure 2 is generally like that described above for Combination #6 (Figure 1g), except for the additional action of the bucking winding 4e and the improved action of the control circuit. The operation is such that a decrease in the line voltage reduces the amount of buck produced in coil 4e and increases the amount of boost produced in winding 3a.

The voltage sensitive circuit connected to rectifier R1 in Figure 2 is an improvement over that shown in Figure 1. The circuit network consists essentially of an input section formed of a parallel resonant combination involving the coil 7a and a condenser 7b connected to the transformer 7d in series with the resistance 7c and the impedance coil 7h, and an output section shunted across the impedance coil 7h and consisting of a series resonant combination including coil 7e and condenser 7f. The arrangement is such that the parallel combination 7a and 7b is in optimum resonance at the highest voltage normally encountered on the line, and any decrease in the input voltage tends to increase the current flowing through impedance 7h and, therefore, increases the voltage drop across this impedance. The series combination 7e and 7f is adjusted so that upon increase in voltage drop across impedance 7h, this combination is brought into a resonant condition and magnifies the output current supplied to the rectifier R1. In other words, the resonance condition of the series combination 7e and 7f acts to amplify the current changes produced by the parallel combination 7a—7b and the net result is a more sensitive circuit than that shown in Figure 1. The presence of reactor 7h prevents any tendency of the parallel combination 7a—7b to hang in resonance, and prevents the so-called "hysteresis" effect, that is, the response is substantially the same for decreasing voltages as for increasing voltages.

It is obvious that, if desired, the arrangement of Figure 2 may be designed so that the winding 4e produces a greater buck than the boost introduced by the winding 3a when the reactor is normally unsaturated. It is also obvious that the bucking winding 4e may be omitted entirely, in which case the operation is substantially as described above for Combination #6 (Figure 1g). The voltage normally maintained on the lines 1 and 2 may be varied by shifting the contacts on the auto-transformers 7d and 9d.

In Figure 3, I have shown a simplified circuit arrangement corresponding generally to Combination #4 (Figure 1e) described above. In this arrangement, the core of the reactor has not been shown. The voltage sensitive circuit connected to rectifier R1 is a simplified arrangement of that shown in Figure 2, but instead of connecting auto-transformer 7d directly to the line, this transformer is supplied with current from another transformer having a primary winding 10a connected to the line wires and a secondary winding 10b connected to the auto transformer. Alternating current is supplied to rectifier R2 from secondary 10c through a variable resistance 9c. The operation of the arrangement shown in Figure 3 will be obvious in view of the operation described for Combination #4 (Figure 1e) and also in view of the description of operation of the voltage sensitive circuit of Figure 2.

In Figure 4 I have shown a circuit diagram of an arrangement generally like that shown in Figure 3. The principal difference between Figure 4 and Figure 3 is in the manner in which the two sections of reactor winding 4a is connected in the primary circuit of the booster transformer, and also in the manner in which current is supplied to the circuits of the two rectifiers. In Figure 4 the two sections of winding 4a are connected in parallel with each other and in series with primary winding 3b of the booster transformer, but the same condition must prevail here as in Figure 1, that is, there should be no substantial inductive coupling between the circuit of winding 4a and the windings on the center leg of the reactor core. The two rectifiers R1 and R2 are shown as bridge arrangements of well known dry rectifier elements such as copper-oxide units, although these rectifiers may be formed of vacuum tubes, if desired. This applies to rectifiers shown in any form of the invention.

The arrangement for supplying current to the rectifier circuits consists of an auto-transformer 11 connected across the lines 1 and 2, and this transformer supplies current to the primary winding 12a of a second transformer having a secondary winding 12b. The supply circuit for rectifier R1 is connected across the primary winding 12a, while the supply circuit for R2 is connected to the secondary winding 12b. Adjustment of the variable tap on the auto-transformer 11 changes the voltage supplied to both rectifier circuits, while the variable tap on the primary and secondary windings 12a and 12b provide independent adjustments of the voltages supplied to these circuits.

In Figure 5 the reactor 4 is provided with only one magnetizing winding 4f which is supplied with direct current from rectifier R3 which in turn is energized with alternating current from conductors 1 and 2 through an auxiliary reactor M. The input circuit of rectifier R3 may also include the series ferro-resonant combination consisting of coil 13a and condenser 13b, or this combination may be excluded by closing switch 14.

The magnetizing winding Ma of reactor M is supplied with direct current from a circuit which includes the output circuits of rectifier R1 and R2 connected with serial circuit relation. A resistance element Ra is connected in shunt to the output circuit of rectifier R1, and a similar resistance Rb is connected in shunt to the output of rectifier R2, and these two resistance elements are connected in series in the magnetizing circuit of reactor M in a direction such that the voltages across Ra and Rb oppose each other. This circuit also includes a filter choke coil Fa and a filter condenser Fb. A rectifier element R4 is also connected in the magnetizing circuit to permit current to flow in one direction only, that is, in the direction of current supplied by rectifier R1. Rectifier R4 prevents saturation of reactor M by current flowing in the opposite direction when the line voltage is abnormally high.

The input circuit of rectifier R1 connected across conductors 1 and 2 includes a variable resistance 7c and a parallel ferro-resonant combination 7a—7b. The input circuit of rectifier R2 connected across conductors 1 and 2 may include a series ferro-resonant combination 9a—9b, or this combination may be excluded from the circuit by closing switch 15.

Various operative combinations are possible with the arrangement shown in Figure 5 as follows:

*Combination (a).*—Switches 14 and 15 closed (see Figure 5a). This arrangement operates generally in the same manner as Combination #4 described above in connection with Figure 1. The parallel resonant combination 7a and 7b is adjusted to optimum resonance at the highest voltage normally encountered on the line and, under this condition, the output voltage of rectifier R1 substantially neutralizes the output voltage of rectifier R2, the impedance of reactor M is at a maximum and current supplied to magnetizing winding 4f is at a minimum, thereby resulting in minimum boost of the booster transformer. When the line voltage drops, the voltage of rectifier R1 exceeds the voltage of R2, and the current flows in the magnetizing winding of reactor M to reduce the impedance of this reactor and thereby increase the current supplied to winding 4f, which in turn decreases the impedance of reactor 4 and thereby increases the boost of the booster transformer.

It will be observed that the operation of Combination (a) is generally the same as that described for Combination #4 (Figure 1e) and for Figure 3, except that the output of rectifiers R1 and R2 controls the auxiliary reactor M instead of controlling the main reactor 4 directly. The auxiliary reactor M and rectifier R3 function in a manner to amplify the control effect of the control circuits connected to rectifiers R1 and R2, but it is obvious that the output circuit of these rectifiers may be connected directly to the magnetizing winding 4f of the main reactor 4, and the reactor M and rectifier R3 may be omitted.

*Combination (b).*—Switch 14 closed and switch 15 open (see Figure 5b). The operation of this combination is the same as for Combination (a) (Figure 5a) above except that the input circuit of rectifier R2 now includes a series resonant combination 9a—9b. The effect of the voltage sensitive circuit 9a—9b in the regulator has already been fully explained in connection with the description of Combination #6 (Figure 1g) of Figure 1 and also the operation of Figure 2.

*Combination (c).*—Switch 14 open and switch 15 open as shown in Figure 5. This combination differs from Combination (b) (Figure 5b) by the inclusion of a series resonant combination 13a—13b in the input circuit of rectifier R3. The operation of the control circuits associated with rectifiers R1 and R2 is the same as described above for Combinations #6 and (b) (Figures 1g and 5b). The resonant combination 13a and 13b is adjusted so that for increasing current in the input circuit of rectifier R3, the combination goes into resonance and greatly increases the change in current beyond that which would normally result in the absence of the resonant combination. In other words, the series resonant combination 13a—13b operates to amplify the control effect of the circuits associated with the auxiliary reactor M.

*Combination (d).*—Switch 14 open and switch 15 closed (see Figure 5d). The operation of this combination is the same as for Combination (c) (Figure 5) except that the series resonant combination 9a—9b does not enter into the operation, and in this respect, Combination (b) (Figure 5b) is not as sensitive as Combination (c) (Figure 5).

*Combination (e).*—Another possible combination based on Figure 5 is an arrangement where rectifier R1 is supplied directly from the line or through a constant voltage network connected to the line, while rectifier R2 is supplied with current through the series resonant circuit 9a—9b, and the switch 14 may be either closed or open. Figure 5e shows the circuit of this combination when switch 14 is open. With this arrangement, the series resonant circuit 9a—9b is adjusted so that it is in resonance at the point A' in Figure 1a at the highest voltage normally encountered, and rectifier R1 is adjusted so that its output voltage is equal to the output voltage of rectifier R2 under this condition. As the line voltage drops below the point A', the output voltage of R2 decreases below that of R1 and a magnetizing current proportional to the net voltage will flow in the magnetizing winding Ma, and thus increase the boost of the booster transformer. In case the resonant circuit 13a—13b is included in the rectifier circuit R3, this resonant combination is adjusted to resonance at the lower bend in the resonance curve so that an increase in current flowing in the rectifier circuit will cause the combination to resonate and magnify the effect of the resonant circuit 9a—9b.

By connecting the outputs of rectifiers R1 and R2 in series as in Figure 5, only one magnetizing winding is required on the reactor M, but, if desired, separate magnetizing windings may be provided on the reactor for the two rectifiers. The single circuit output connection of the two rectifiers R1 and R2 of Figure 5 may also be used in any of the other systems disclosed herein where two opposing sources of magnetizing current are employed.

In forming the inductances of the voltage sensitive circuits disclosed herein I prefer to use closed magnetic circuits formed of cores of magnetic material which saturates with increasing current values. Ordinary transformer iron consisting of silicon steel is satisfactory.

While I have shown my invention as employing a saturable reactor 4 having three legs, it will be understood that a reactor with four legs may be used, or any other known form of saturable reactor may be employed. Also, it will be understood that the sections of the alternating current windings of the reactor may be connected in series relation, as in Figure 1, or in parallel relation, as in Figure 4. Where a constant current is required for one of the magnetizing windings, a battery or other indepedent source of current may be used, if desired, instead of deriving the current directly from the line circuit.

It will be understood that the input circuits of rectifiers R1 and R2 in any of the arrangements disclosed herein may be connected directly to the line conductors through adjustable series resistances, or they may be connected to the line through individual transformers provided with arrangements for adjusting the voltage applied to the input circuits.

In any of the circuits disclosed herein, the reactor 4 may be connected in series with one of the line conductors between the source and the booster transformer, if desired, but I prefer to connect the reactor in series with the primary winding of the booster transformer as shown.

I have herein explained the principle of my invention and illustrated several embodiments thereof, but I do not intend to be limited to the specific arrangements herein disclosed, except as required by the appended claims.

What I claim is:

1. In combination, an alternating current line, a booster transformer connected in said line, means for controlling the boost of said transformer including a magnetizing winding, said means being operable upon increase in magnetizing current to increase the boost of said transformer, a voltage sensitive circuit connected across said line and including a parallel ferro-resonant circuit connected in series therewith and having optimum resonance at the highest normal voltage of said line, a rectifier connected in series with said voltage sensitive circuit and having its output circuit connected to supply direct current to said magnetizing winding variable in magnitude substantially with the variation in amplitude of alternating current flowing through said parallel ferro-resonant circuit.

2. In combination, a source of alternating current, means for varying the value of the voltage of said source, means for controlling said varying means including a magnetizing winding, said controlling means being operable upon increase in magnetizing current to increase the voltage of said source, a voltage sensitive circuit connected across said source and including a parallel ferro-resonant circuit connected in series therewith and having optimum resonance at the highest normal voltage of said source, a rectifier connected in series with said voltage sensitive circuit and having its output circuit connected to supply direct current to said magnetizing winding variable in magnitude substantially with the variation in amplitude of alternating current flowing through said parallel ferro-resonant circuit.

3. In combination, an alternating current line, a booster transformer connected in said line, means for controlling the boost of said transformer including a magnetizing winding, said means being operable upon increase in magnetizing current to increase the boost of said transformer, a voltage sensitive circuit connected across said line and including a parallel ferro-resonant circuit connected in series therewith and having optimum resonance at the highest normal voltage of said line, a rectifier connected in series with said voltage sensitive circuit and having its output circuit connected to supply direct current to said magnetizing winding variable in magnitude substantially with the variation in amplitude of alternating current flowing through said parallel ferro-resonant circuit, and a second source of magnetizing current for neutralizing the effect of said rectified current upon said boost controlling means at the optimum resonant condition of said parallel circuit.

4. In combination, an alternating current line, a booster transformer connected in said line, means for controlling the boost of said transformer including a magnetizing winding, said means being operable upon increase in magnetizing current to increase the boost of said transformer, means including a rectifier and a circuit network connecting said rectifier to said line for supplying direct current to said winding, said circuit net work including a parallel ferro-resonant combination, a second magnetizing winding, and a source of substantially constant current for energizing said second winding to neutralize the effect of the first winding at resonant condition.

5. In combination, an alternating current line, a booster transformer connected in said line, a saturatable reactor connected in series with the potential winding of said transformer, a magnetizing winding on said reactor, means for energizing said winding including a rectifier and a circuit connecting said rectifier to said line including a parallel ferro-resonant combination, a second magnetizing winding on said reactor, and a source of current for energizing said second winding to neutralize the effect of the first magnetizing winding at the resonant condition of said parallel combination.

6. In combination, an alternating current line, a booster transformer connected in said line, a saturatable reactor connected in series with the potential winding of said transformer, a magnetizing winding on said reactor, means for energizing said winding including a rectifier and a circuit connecting said rectifier to said line including a parallel ferro-resonant combination, a second magnetizing winding on said reactor, and means for energizing said second winding in opposition to the first winding including a rectifier connected to said line by a series ferro-resonant combination.

7. In combination, an alternating current line, a booster transformer connected in said line, a saturatable reactor connected in series with the potential winding of said transformer, a magnetizing winding on said reactor, means for energizing said winding including a rectifier and a circuit connecting said rectifier to said line including a voltage sensitive network, said network comprising an input section including in serial circuit relation an impedance element and a parallel ferro-resonant combination, and an output section including said impedance element and also including in serial circuit relation a series ferro-resonant combination, a second magnetizing winding on said reactor, and means for energizing said second winding in opposition to the first winding including a rectifier energized from said line and adjusted to neutralize the effect of the first winding at the resonant condition of said parallel combination.

8. In combination, an alternating current line, a booster transformer connected in said line, means for controlling the boost of said transformer including a saturable reactor, a magnetizing winding on said reactor, means for energizing said winding including a rectifier and a voltage sensitive circuit connecting said rectifier to said line including a ferro-resonant combination, a second magnetizing winding on said reactor, and means for energizing said second winding in opposition to the first winding including a rectifier energized from said line and adjusted to neutralize the effect of the first winding at the optimum resonant condition of said resonant combination.

9. In combination, an alternating current line, a booster transformer connected in said line, means for controlling the boost of said transformer including a saturable reactor, a magnetizing winding on said reactor, means for energizing said winding including a rectifier and a circuit connecting said rectifier to said line including a series ferro-resonant combination adjusted to optimum resonance at the maximum normal voltage of the line, a second magnetizing winding on said reactor, and means for energizing said second winding in opposition to the first winding including a rectifier and a circuit connecting said rectifier to said line including a ferro-resonant combination having a different characteristic from said first combination.

10. In combination, a booster transformer, means for controlling the boost of said transformer including a saturable reactor, means for magnetizing said reactor including two opposing sources of magnetizing current, one of said sources comprising a rectifier and a circuit connecting said rectifier to said transformer and including a parallel ferro-resonant circuit responsive to voltage changes, said other source including a second rectifier and a circuit connecting said second rectifier to said transformer and including a series ferro-resonant combination.

11. In combination, an alternating current supply line, a booster transformer connected in said line, means for controlling the boost of said transformer including a magnetizing winding, a rectifier for supplying direct current to said winding, a circuit connecting said rectifier to said line including a saturable reactor and a series ferro-resonant combination, and means for controlling the saturation of said reactor, said saturation controlling means including a rectifier and a voltage sensitive circuit connecting said rectifier to said alternating current line.

12. In combination, an alternating current supply line, a booster transformer connected in said line, means for controlling the boost of said transformer including a magnetizing winding, a rectifier for supplying direct current to said winding, a circuit connecting said rectifier to said line including a saturable reactor and a series ferro-resonant combination, and means for controlling the saturation of said reactor, said saturation controlling means including a rectifier and a circuit connecting said rectifier to said alternating current line including a parallel ferro-resonant combination.

13. In combination, an alternating current supply line, a booster transformer connected in said line, means for controlling the boost of said transformer including a magnetizing winding, a rectifier for supplying direct current to said winding, a circuit connecting said rectifier to said line including a saturable reactor, and means for controlling the saturation of said reactor, said saturation controlling means including a rectifier and a voltage sensitive circuit connecting said rectifier to said alternating current line.

14. A voltage sensitive network comprising input and output terminals, and circuit connecting said terminals formed of two sections, a parallel ferro-resonant combination connected in the section adjacent the input terminals, a series ferro-resonant combination connected in the section adjacent the output terminals, and an iron-cored impedance connected in shunt to said circuit between said sections.

15. A voltage sensitive network comprising a pair of input terminals, a pair of output terminals, a connection from one input terminal to one output terminal, a connection from the other input terminal to the other output terminal, one of said connections including in serial circuit relation a parallel ferro-resonant combination and a series ferro-resonant combination, and an iron-cored impedance connected in shunt to said connections by a variable tap on the inductance coil of said parallel combination.

16. In combination, a booster transformer, means for controlling the boost of said transformer including a magnetizing winding, said means being operable upon increase in magnetizing current to increase the boost of said transformer, a source of direct current for energizing said winding including a rectifier and a circuit network connecting said rectifier to said transformer, said circuit network including a parallel ferro-resonant circuit sensitive to voltage changes, means including a second source of direct current for neutralizing the action of the first source of direct current upon said boost controlling means at the optimum resonant voltage of said parallel resonant circuit, a series ferro-resonant combination, said second source of direct current including a rectifier connected to said transformer by an energizing circuit including said series ferro-resonant combination.

17. A circuit network for detecting changes in voltage comprising, an input circuit and an output circuit, an impedance element coupling said input and output circuits, said input circuit including in serial circuit relation a ferro-resonant combination responsive to changes in input voltage for impressing current changes upon said coupling impedance within the resonant range of said combination, and a ferro-resonant combination in said output circuit responsive to voltage variations across said coupling impedance produced by current variations within the resonant range of the first resonant combination for establishing a resonant condition in the output circuit to vary the current in the output circuit in accordance with current changes in said impedance and with magnified amplitude.

18. A voltage sensitive network according to claim 17 in which one ferro-resonant combination is a series combination and the other ferro-resonant combination is a parallel combination, and the impedance coupling element is connected to an intermediate point on the inductance of the parallel combination.

PALMER HUNT CRAIG.